(12) United States Patent
Chen et al.

(10) Patent No.: US 6,902,458 B2
(45) Date of Patent: Jun. 7, 2005

(54) SILICON-BASED DIELECTRIC TUNNELING EMITTER

(75) Inventors: Zhizhang Chen, Corvallis, OR (US); Michael David Bic, Corvallis, OR (US); Ronald L. Enck, Corvallis, OR (US); Michael J. Regan, Corvallis, OR (US); Thomas Novet, Corvallis, OR (US); Paul J. Benning, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3 days.

(21) Appl. No.: 10/755,890

(22) Filed: Jan. 12, 2004

(65) Prior Publication Data

US 2004/0140748 A1 Jul. 22, 2004

Related U.S. Application Data

(62) Division of application No. 09/846,047, filed on Apr. 30, 2001, now Pat. No. 6,753,544.

(51) Int. Cl.[7] .............................. H01L 29/06; H01J 9/04
(52) U.S. Cl. ........................ 445/50; 445/49; 445/51; 438/20; 427/49; 427/77; 257/10; 257/11; 313/309; 313/311; 313/336; 313/495; 313/497
(58) Field of Search .................. 313/309–311, 336, 313/495, 497; 445/49–51; 438/20; 257/9–11

(56) References Cited

U.S. PATENT DOCUMENTS

| | | |
|---|---|---|
| 4,303,930 A | 12/1981 | VanGorkom |
| 4,516,146 A | 5/1985 | Shannon et al. |
| 5,090,932 A | 2/1992 | Dieumegard et al. |
| 5,414,272 A | 5/1995 | Watanabe et al. |
| 5,473,218 A | 12/1995 | Moyer |
| 5,554,859 A | 9/1996 | Tsukamoto et al. |
| 5,557,596 A | 9/1996 | Gibson et al. |
| 5,559,342 A | 9/1996 | Tsukamoto et al. |
| 5,696,385 A | 12/1997 | Song |
| 5,702,281 A | 12/1997 | Huang |
| 5,726,524 A | 3/1998 | Debe |
| 5,760,417 A | 6/1998 | Watanabe et al. |
| 5,814,832 A | 9/1998 | Takeda et al. |
| 5,982,091 A | 11/1999 | Konishi |
| 6,008,576 A | 12/1999 | Nakatani et al. |
| 6,011,356 A | 1/2000 | Janning et al. |
| 6,023,124 A | 2/2000 | Chuman et al. |
| 6,034,479 A | 3/2000 | Xia |
| 6,064,149 A | 5/2000 | Raina |
| 6,084,245 A * | 7/2000 | Hsu et al. ............... 257/10 |

(Continued)

FOREIGN PATENT DOCUMENTS

| | | |
|---|---|---|
| EP | 0989577 | 3/2000 |
| EP | 1003195 | 5/2000 |
| EP | 1094485 | 4/2001 |
| JP | 2001118489 | 4/2001 |
| JP | 2001118500 | 4/2001 |

OTHER PUBLICATIONS

Kusunoki, T et al, "Increasing Emission Current from MIM Cathodes by Using IR–PE–AU Multilayer Top Electrode", IEEE Transactions on Electron Devices, V. 47, No. 8, Aug. 2000, pp 1667–1672.

*Primary Examiner*—Nimeshkumar D. Patel
*Assistant Examiner*—Sikha Roy
(74) *Attorney, Agent, or Firm*—Timothy F Myers

(57) ABSTRACT

An emitter has an electron supply layer and a silicon-based dielectric layer formed on the electron supply layer. The silicon-based dielectric layer is preferably less than about 500 Angstroms. Optionally, an insulator layer is formed on the electron supply layer and has openings defined within which the silicon-based dielectric layer is formed. A cathode layer is formed on the silicon-based dielectric layer to provide a surface for energy emissions of electrons and/or photons. Preferably, the emitter is subjected to an annealing process thereby increasing the supply of electrons tunneled from the electron supply layer to the cathode layer.

12 Claims, 12 Drawing Sheets

U.S. PATENT DOCUMENTS

| | | | |
|---|---|---|---|
| 6,096,570 A | 8/2000 | Hattori | |
| 6,107,732 A | 8/2000 | Tolt | |
| 6,137,212 A | 10/2000 | Liu et al. | |
| 6,166,487 A | 12/2000 | Negishi | |
| 6,229,758 B1 | 5/2001 | Agata | |
| 6,249,080 B1 | 6/2001 | Komoda | |
| 6,255,185 B1 * | 7/2001 | Coolbaugh et al. | 438/382 |
| 6,329,745 B2 | 12/2001 | Patterson | |
| 6,400,070 B1 * | 6/2002 | Yamada et al. | 313/310 |
| 6,445,124 B1 | 9/2002 | Asai | |
| 6,469,425 B1 | 10/2002 | Sakai | |

* cited by examiner

SILICON-BASED DIELECTRIC TUNNELING EMITTER

CROSS REFERENCE TO RELATED APPLICATION

This application is a divisional of commonly assigned application Ser. No. 09/846,047, filed Apr. 30, 2001, now U.S. Pat. No. 6,753,544 the entire disclosure of which is incorporated herein by reference.

FIELD OF THE INVENTION

The invention is directed to field emission devices. In particular the invention is directed to the flat field emission emitters utilizing direct tunneling and their use in electronic devices.

BACKGROUND OF THE INVENTION

Several different field emission devices have been proposed and implemented to create electron emissions useful for displays or other electronic devices such as storage devices. Traditionally, vacuum devices with thermionic emission such as electron tubes required the heating of cathode surfaces to create the electron emission. The electrons are drawn in a vacuum space to an anode structure that is at a predetermined voltage potential to attract the electrons. For a display device such as a cathode ray tube, the anode structure is coated with phosphors such that when an electron impinges on the phosphor, photons are generated to create a visible image. Cold cathode devices such as spindt tips (pointed tips) have been used to replace the hot cathode technology. However, it has been difficult to reduce the size and integrate several spindt tips while maintaining reliability. As the size is reduced, the spindt tip becomes more susceptible to damage from contaminants in the vacuum that are ionized when an electron strikes it. The ionized contaminant is then attracted to the spindt tip and collides with it, thereby causing damage. To increase the life of the spindt tip, the vacuum space must have an increasingly high vacuum. A flat emitter having a larger emission surface can be operated reliably at lower vacuum requirements. However, for some applications, the amount of current density from conventional flat emitters is not high enough to be useful. Thus a need exists to create a flat emitter that has high-energy current density that is also able to operate reliably in low vacuum environments.

SUMMARY

An emitter has an electron supply layer and a silicon-based dielectric layer formed on the electron supply layer. The silicon-based dielectric layer is preferably less than about 500 Angstroms. Optionally, an insulator layer is formed on the electron supply layer and has openings defined within in which the silicon-based dielectric layer is formed. A cathode layer is formed on the silicon-based dielectric layer to provide a surface for energy emissions of electrons and/or photons. Preferably, the emitter is subjected to an annealing process thereby increasing the supply of electrons tunneled from the electron supply layer to the cathode layer.

DETAILED DESCRIPTION OF THE PREFERRED AND ALTERNATE EMBODIMENTS

Figure 1:
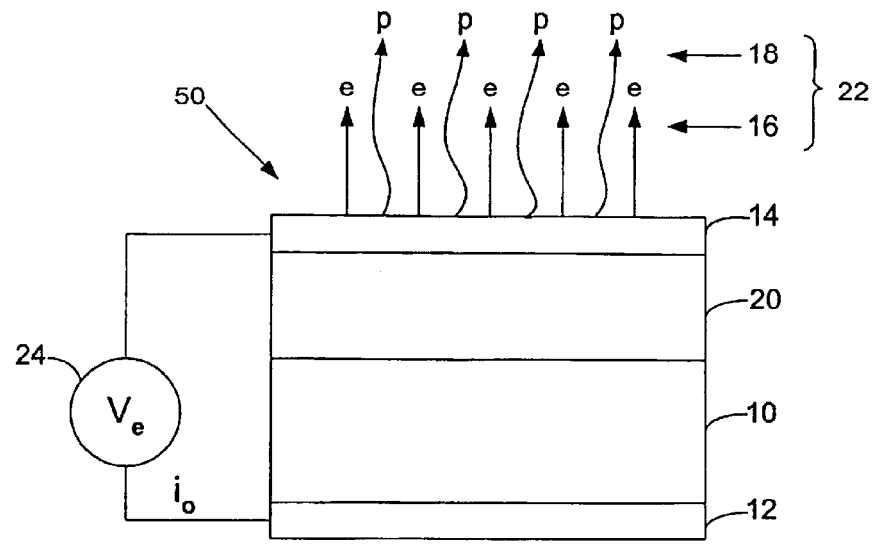
FIG. 1 is an exemplary illustration of a tunneling emitter incorporating the invention.

The present invention is directed to field emission emitters that provide high levels of emission current per square centimeter by using a silicon-based dielectric layer that has a sufficient thinness between about 200 and about 5000 Angstroms to create an electric field between an electron source and a flat cathode surface. Conventional flat emitter type devices have low emission current per square centimeter of surface area and thus are not usable in several applications. The invention uses a thin deposition of a silicon-based dielectric having suitable defects, to create a barrier in which electrons can tunnel between the electron source and the cathode surface through the defects within the dielectric. By using such a material, the emission current can be greater than 10 mAmps, 100 mAmps, or 1 Amp per square centimeter which is one, two, or three orders of magnitude, respectively, greater than that of conventional flat emitter technology. The actual emission rate will depend upon the design choices of the type and thickness of material used for the silicon-based dielectric layer. In addition to electron emissions, the invention is also able to create photon emissions that provides for additional uses for the emitter incorporating the invention. Further advantages and features of the invention will become more apparent in the following description of the invention, its method of making and various applications of use.

In the illustrations of this description, various parts of the emitter elements have not been drawn to scale. Certain dimensions have been exaggerated in relation to other dimensions in order to provide a clearer illustration and understanding of the present invention. For the purposes of illustration, the embodiments illustrated herein are shown in two-dimensional views with various regions having depth and width. It should be understood that these region are illustrations only of a portion of a single cell of a device, which may include a plurality of such cells arranged in a three-dimensional structure. Accordingly, these regions will have three dimensions, including length, width, and depth when fabricated on an actual device.

Further, one aspect of the invention is that it can be fabricated using conventional integrated circuit thin-film technologies. Several different technologies exist to perform several of the process steps and can be interchanged by those having skill in the art. For example, unless specifically called out, deposition of material can be by one of several processes such as evaporation, sputtering, chemical vapor deposition, molecular beam epitaxy, photochemical vapor deposition, low temperature photochemical vapor deposition, and plasma deposition, to name a few. Additionally, several different etch technologies exist such as wet etching, dry etching, ion beam etching, reactive ion etching, and plasma etching such as barrel plasma etching and planar plasma etching to name some of the possible etching technologies. Choice of actual technologies used will depend on material used and cost criteria among other factors.

FIG. 1 is an exemplary diagram of an emitter device 50, preferably a flat emitter for electron and photon emission, which includes an electron source 10. On the electron source 10 is a silicon-based dielectric layer 20. Preferably, the silicon-based dielectric layer 20 is formed from a silicon based dielectric such as $SiN_x$, $Si_3N_4$ (RI~2.0), $Si_xN_y$ (x:y>¾, RI~2.3), and SiC. Also, $F_y$—$SiO_x$ and $C_y$—$SiO_x$ are envisioned as being capable of use as silicon-based dielectric layer 20. The silicon-based dielectric layer preferably has a thickness about 500 Angstroms and preferably the thickness is within the range of about 250 to about 5000 Angstroms, such as 500 Angstroms or less. The chosen thickness determines the electrical field strength that the silicon-based dielectric layer must be able to withstand and the desired emitter emission current. Disposed on the silicon-based dielectric layer 20 is a cathode layer 14, preferably a thin-film conductor such as platinum, gold, molybdenum, iridium, ruthenium, tantalum, chromium, or other refractive metals or alloys thereof. Other cathode layers can be used and are known to those skilled in the art. Preferably, the thickness of the cathode layer is 30 to 150 Angstroms. When a voltage source 24 having an emitter voltage $V_e$ (about 3–10V) is applied to the cathode layer 14 and electron supply 10 via a contact 12, electrons tunnel from the substrate 10 (an electron supply) to the cathode layer 14. Because of the defects within the silicon-based dielectric layer 20, the electric field in which the electrons tunnel through is punctuated with various gaps and the electron emission 16 from the surface of the cathode layer 14 is greater than conventional designs. Also, photon emission 18 occurs along with the electron emission 16 to form the energy emission 22 from the emitter 50.

The electron field is calculated for various thicknesses as $$\vec{E} = \frac{V_e}{t_{thickness}}$$

where $t_{thickness}$ is the thickness of silicon-based dielectric layer 20. For example, for a $V_e$=10V, the electric field is equal to $2\times10^6$ volts/meter for a 500 Angstrom thickness in the silicon-based dielectric layer. The minimum thickness for a particular carbon-based dielectric will depend on its dielectric strength.

Preferably, the silicon-based dielectric layer 20 is deposited using plasma enhanced chemical vapor deposition (PECVD). By using silicon-based dielectrics as the silicon-based dielectric layer, defective areas throughout the material are achieved and tunneling is done through the various defects due to the electric field generated between the electron source 10 and the cathode layer 14.

Figure 2:
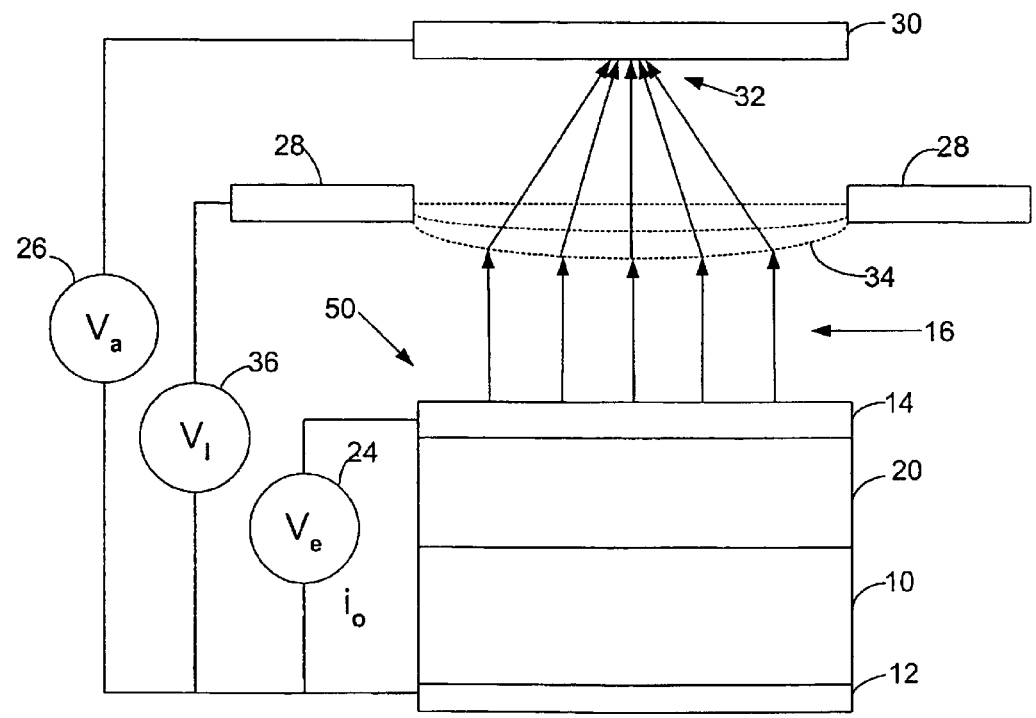
FIG. 2 is an exemplary illustration of the use of the tunneling emitter of FIG. 1 to create a focused electron beam.

FIG. 2 is an exemplary diagram of a use for the emitter 50 of FIG. 1. In this application, the electron emission 16 is focused by an electrostatic focusing device or lens 28, exemplified as an aperture in a conductor that is set at predetermined voltage 36 that can be adjusted to change the focusing effect of the lens 28. Those skilled in the art will appreciate that lens 28 can be made from more than one conductor layer to create a desired focusing effect. The electron emission 16 is focused by lens 28 into a focused beam 32 onto an anode structure 30. The anode structure 30 is set at an anode voltage $V_a$ 26 which magnitude varies for an application depending on the intended use and the distance from the anode structure 30 to the emitter 50. For instance, with anode structure 30 being a recordable medium for a storage device, $V_a$ might be chosen to be between 500 and 1000 Volts. The lens 28 focuses the electron emission 16 by forming an electric field 34 within its aperture. By being set at a proper voltage from $V_e$, the electrons emitted from the emitter 50 are directed to the center of the aperture and then further attracted to the anode structure 30 to form the focused beam 32.

Figure 3:
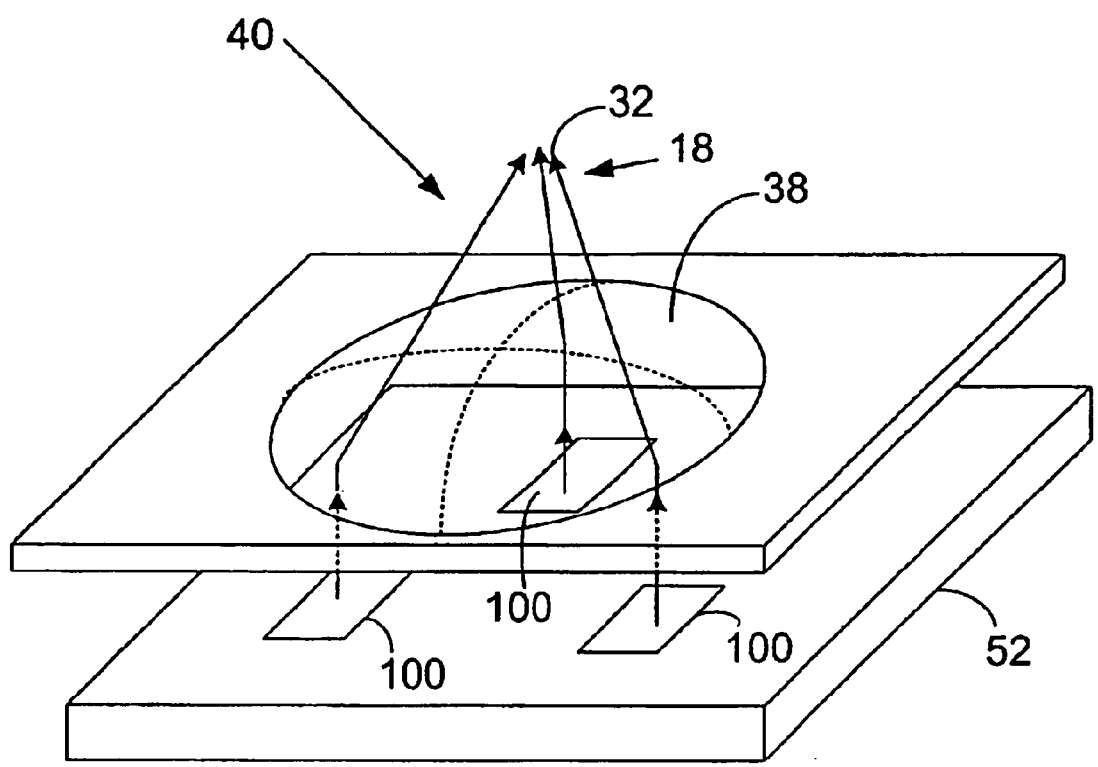
FIG. 3 is an exemplary illustration of an integrated circuit that includes several tunneling emitters and an optical lens to create a display device.

FIG. 3 is an exemplary embodiment of a display 40 having an integrated circuit 52 that includes multiple integrated emitters 100 formed in an array of pixel groups. The integrated emitters 100 emit photon emission 18, a visible light source, which is focused with an optical lens 38 to a focused beam 32 that is viewable as an image. Preferably, the optical lens 38 is coated with a transparent conducting surface, such as indium tin oxide, to capture electrons emitted from the emitter.

Figure 4:
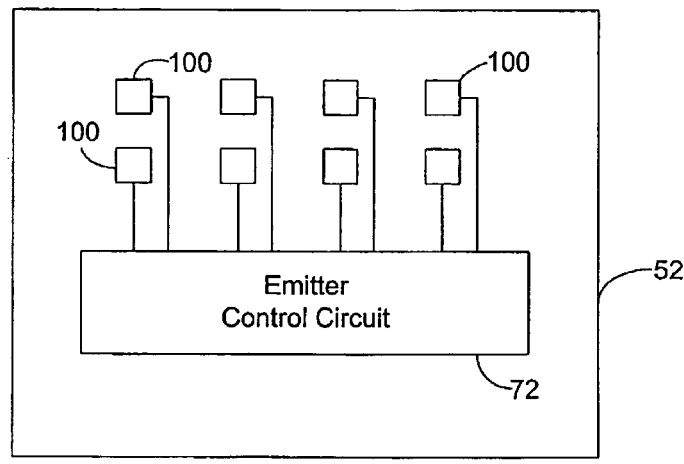
FIG. 4 is an exemplary block diagram of an integrated circuit that incorporates multiple tunneling emitters and control circuitry.

FIG. 4 is an exemplary embodiment of an integrated circuit 52 that includes at least one integrated emitter 100 but preferably a plurality of integrated emitters 100 arraigned in an array. An emitter control circuit 72 is integrated onto the integrated circuit 52 and used to operate the at least one integrated emitter 100.

Figure 5:
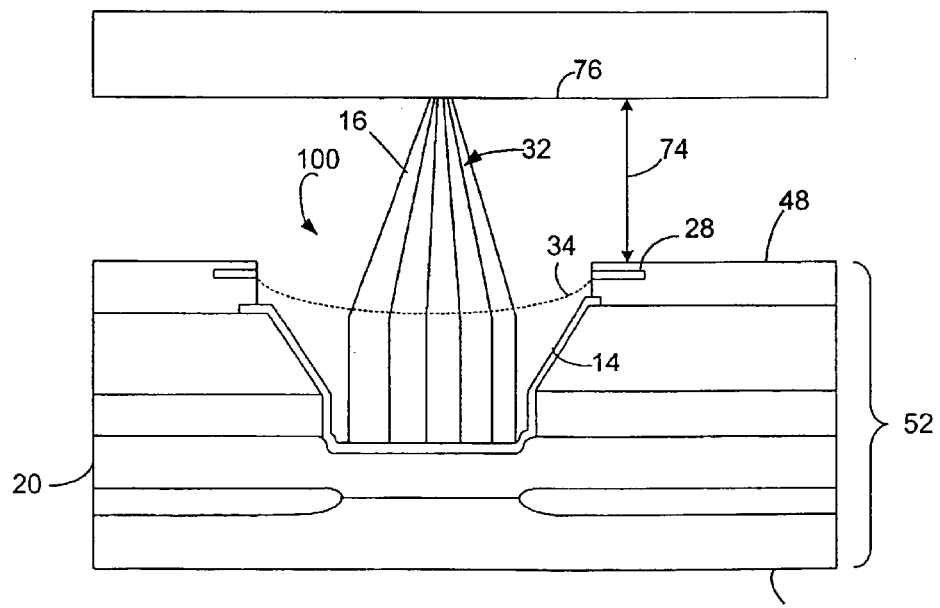
FIG. 5 is an exemplary illustration of a tunneling emitter on an integrated circuit that includes a lens for focusing the energy emissions from the tunneling emitter.

FIG. 5 is an exemplary embodiment of an integrated circuit 52 that includes an integrated emitter 100 and a lens array 48. The integrated circuit 52 is formed on a conductive array 10, preferably heavily doped silicon or a conductive material such as a thin film conductive layer to provide an electron source. On the substrate 10 is disposed a silicon-based dielectric layer 20 having a thickness between about 250 Angstroms and about 5000 Angstroms, preferably about 500 Angstroms although about 250 to about 750 Angstroms is further preferable for some applications. Different layers of semiconductor thin-film materials are applied to the substrate 10 and etched to form the integrated emitter 100. Disposed on the silicon-based dielectric layer 20 is a cathode layer 14, preferably a thin-film conductive layer of platinum, gold, molybdenum, iridium, ruthenium, tantalum, chromium, or other refractive metals or alloys thereof. The cathode layer 14 forms a cathode surface from which energy in the form of electrons and photons are emitted. The lens array 48 is applied using conventional thin-film processing and includes a lens 28 defined within a conductive layer and aligned with the integrated emitter 100 to focus the energy from the integrated emitter 100 onto a surface of an anode structure 76. Anode structure 76 is located a target distance 74 from the integrated circuit 52.

Figure 6:
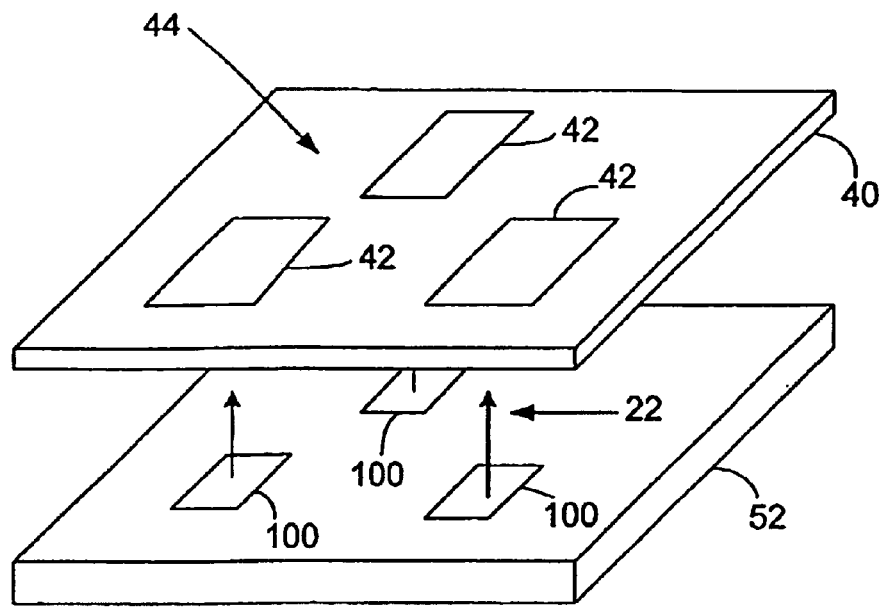
FIG. 6 is an exemplary display that is created from an integrated circuit that includes multiple tunneling emitters and an anode structure that creates or passes photons.

FIG. 6 is an alternative embodiment of a display application using the integrated emitter 100 of the invention. In this embodiment, a plurality of emitters 100 is arraigned and formed in an integrated circuit 52. Each of the emitters 100 emits energy emission 22 in the form of electron emissions 16 or photon emissions 18 (see FIG. 1). An anode structure, display 40, receives the emitted energy in display pixel 44, made up of display sub-pixels 42. Display sub-pixel 42 is preferably a phosphor material that creates photons when struck by the electron emission 16 of energy emission 22. Alternatively, display sub-pixel 42 can be a translucent opening to allow photon emission 18 of energy emission 22 to pass through the display 40 for direct photon viewing.

Figure 7:
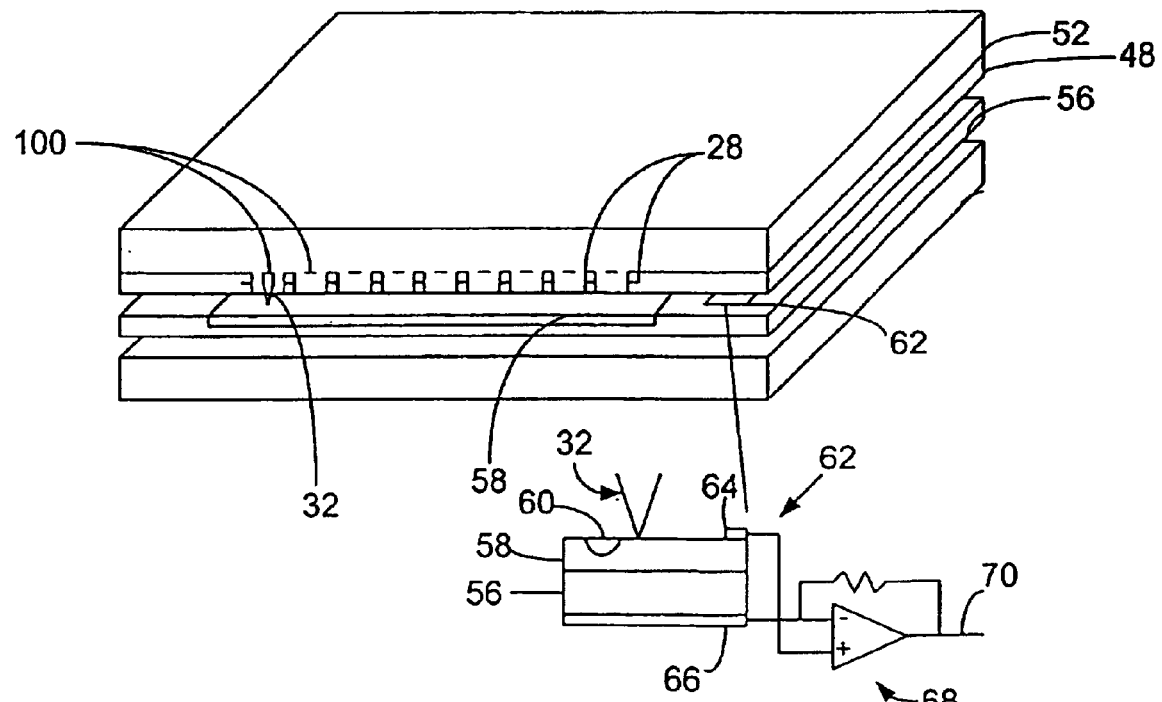
FIG. 7 is an exemplary storage device that incorporates an integrated circuit that includes multiple tunneling emitters for reading and recording information onto a rewriteable media.

FIG. 7 is an alternative use of an integrated emitter 100 within in a storage device. In this exemplary embodiment, an integrated circuit (IC) 52 having a plurality of integrated emitters 100 has a lens array 48 of focusing mechanisms aligned with integrated emitters 100. The lens array 48 is used to create a focused beam 32 that is used to affect a recording surface, media 58. Media 58 is applied to a mover 56 that positions the media 58 with respect to the integrated emitters 100 on IC 52. Preferably, the mover 56 has a reader circuit 62 integrated within. The reader 62 is shown as an amplifier 68 making a first ohmic contact 64 to media 58 and a second ohmic contact 66 to mover 56, preferably a semiconductor or conductor substrate. When a focused beam 32 strikes the media 58, if the current density of the focused beam is high enough, the media is phase-changed to create an effected media area 60. When a low current density focused beam 32 is applied to the media 58 surfacer different rates of current flow are detected by amplifier 68 to create reader output 70. Thus, by affecting the media with the energy from the emitter 50, information is stored in the media using structural phase changed properties of the media. One such phase-change material is $In_2Se_3$. Other phase change materials are known to those skilled in the art.

Figure 8:
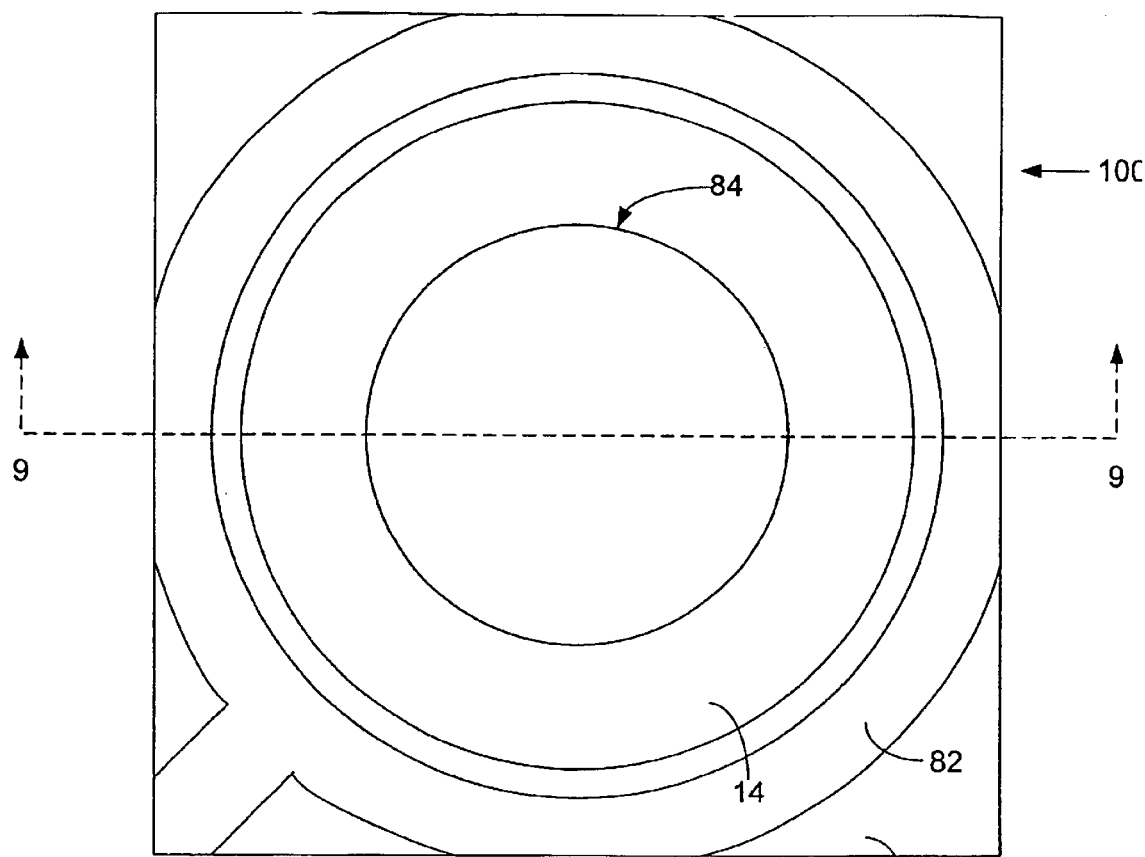
FIG. 8 is a top view of an exemplary tunneling emitter.

FIG. 8 is a top view of an exemplary embodiment of the invention of an integrated emitter 100 that includes an emitter area 84 within the cathode layer 14. The cathode layer 14 is electrically coupled to and disposed on conductive layer 82 that is disposed over insulator layer 78. Integrated emitter 100 is shown as preferably a circular shape, however other shapes can be used. The circular shape is preferable in that the electric fields generated are more uniform as there are no discrete edges within the shape.

Figure 9:
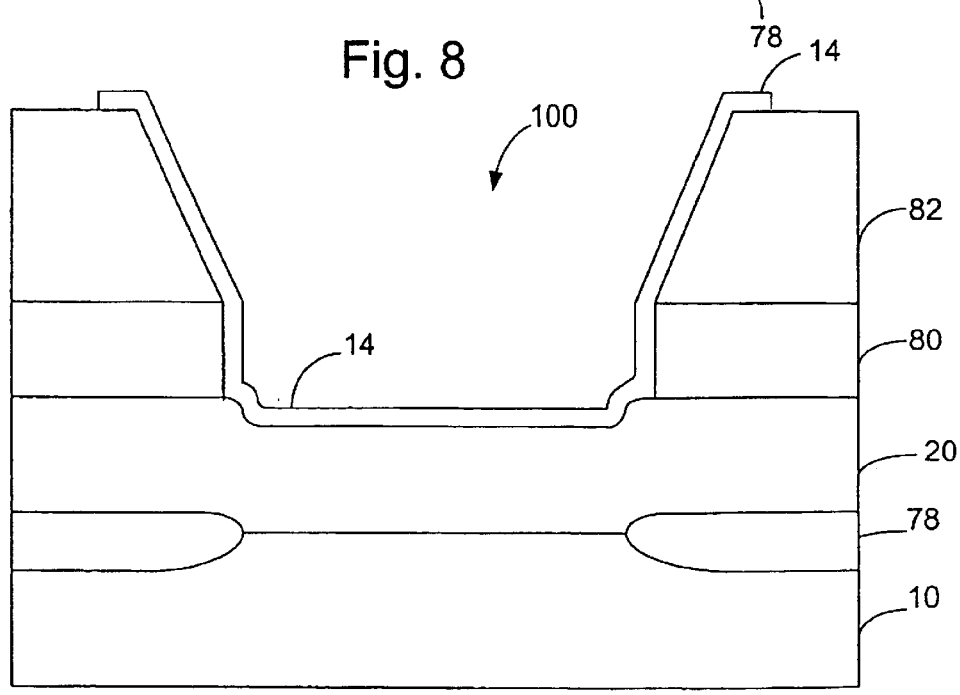
FIG. 9 is an exemplary cross-sectional view of the tunneling emitter shown in FIG. 8.

FIG. 9 is a cross-section of the exemplary embodiment of integrated emitter 100 shown in FIG. 8 looking into the 9—9 axis. A substrate 10, preferably a conductive layer or a highly doped semiconductor provides an electron supply to silicon-based dielectric layer 20 that is disposed within an opening defined within an insulator layer 78 and over the surface of insulator layer 78. A cathode layer 14, preferably a thin-film conductive layer is disposed over the silicon-based dielectric layer 20 and partially over the conductive layer 82 thereby making electrical contact with the conductive layer. Optionally, an adhesion layer 80 can added to provide for a bonding interface between the conductive layer 82 and the insulator layer 78 depending on the particular materials chosen for insulator layer 78 and conductive layer 82.

Figure 10:
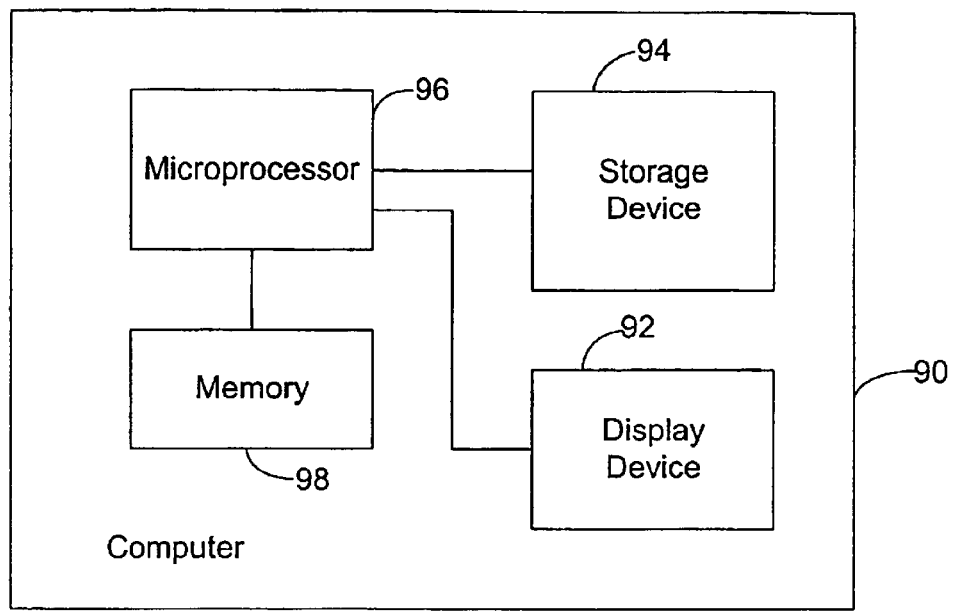
FIG. 10 is an exemplary block diagram of a computer that incorporates at least one of the electronic devices, a display or storage device, which incorporate the tunneling emitters of the invention.

FIG. 10 is an exemplary block diagram of a computer 90 that includes a microprocessor 96, memory 98, which is coupled to the microprocessor 96, and electronic devices, a storage device 94 and a display device 92. The electronic devices are coupled to the microprocessor 96. The microprocessor 96 is capable of executing instructions from the memory to allow for the transfer of data between the memory and the electronic devices, such as the storage device 94 and the display device 92. Each electronic device includes an integrated circuit that has an emitter incorporating the invention and preferably a focusing device for focusing the emissions from the emitter. The emitter has an electron supply layer with an insulating layer disposed thereon. The insulating layer has an opening defined within which a silicon-based dielectric layer is formed on the electron supply layer. On the silicon-based dielectric layer is a cathode layer. Preferably but optionally, the integrated circuit with the emitter has been subjected to an annealing process thereby increasing the supply of electrons that can tunnel from the electron supply layer to the cathode layer.

Figure 11A:
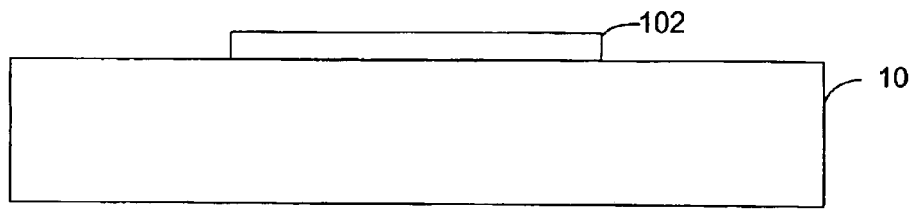
FIGS. 11A–11L are illustrations of exemplary steps used in an exemplary process to create the tunneling emitter of the invention.

FIGS. 11A to 11L illustrate exemplary process steps used to create an emitter incorporating the invention. In FIG. 11A, a mask 102, of dielectrics or photoresist is applied to a substrate 10, preferably a silicon semiconductor substrate, although substrate 10 might be a conductive thin-film layer or a conductive substrate. Preferably substrate 10 has a sheet resistance of about 100 to 0.0001 ohms centimeter.

Figure 11B:

In FIG. 11B an insulator layer 78 is created, preferably by field oxide growth when substrate 10 is a silicon substrate. Optionally, the insulator layer 78 can be formed of other oxide, nitride, or other conventional dielectrics deposited or grown alone or in combination using conventional semiconductor processes. The insulator layer 78 is created on substrate except in areas covered by mask 102. The area defined by mask 102, and thus the resulting voids or defined openings within insulator layer 78 determines the location and shape of the latter formed integrated emitter 100 when mask 102 is removed.

Figure 11C:
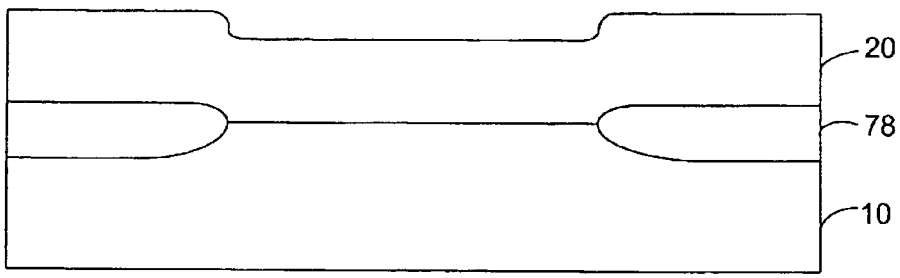

In FIG. 11C, a silicon-based dielectric layer 20 is applied on the substrate 10 and insulator layer 78. Preferably, the silicon-based dielectric layer 20 is applied using plasma enhanced chemical vapor deposition (PECVD). Other deposition techniques are known to those skilled in the art. The silicon-based dielectric layer 20 is preferably SiC, $SiN_x$, $Si_3N_4$ (RI~2.0), or $Si_xN_y$ (x:y>¾, RI~2.3). Optionally, $F_y$—$SiO_x$ and $C_y$—$SiO_x$ are envisioned as suitable material for silicon-based dielectric layer 20. The silicon-based dielectric layer 20 is preferably about 250 to about 5000 Angstroms thick.

Figure 11D:
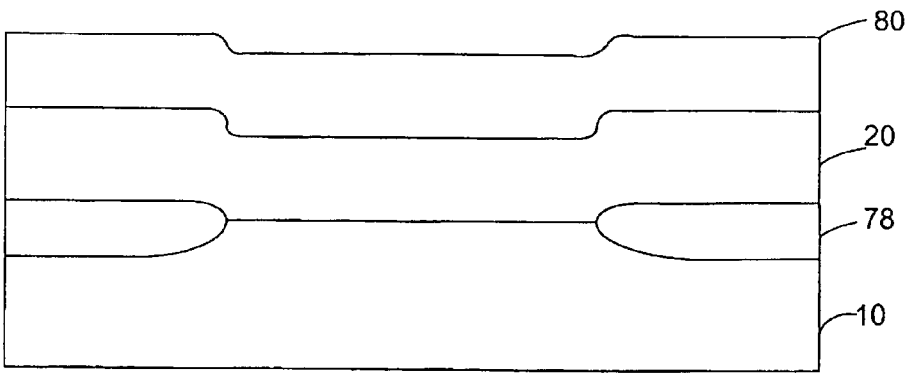

In FIG. 11D, an optional adhesive layer 80 is applied on the silicon-based dielectric layer 20. The adhesive layer 80 is preferably tantalum when the later applied conductive layer 82 (see FIG. 11D) is made of gold. Preferably, the adhesive layer is applied using conventional deposition techniques. The adhesive layer is preferably about 100 to about 200 Angstroms thick.

Figure 11E:
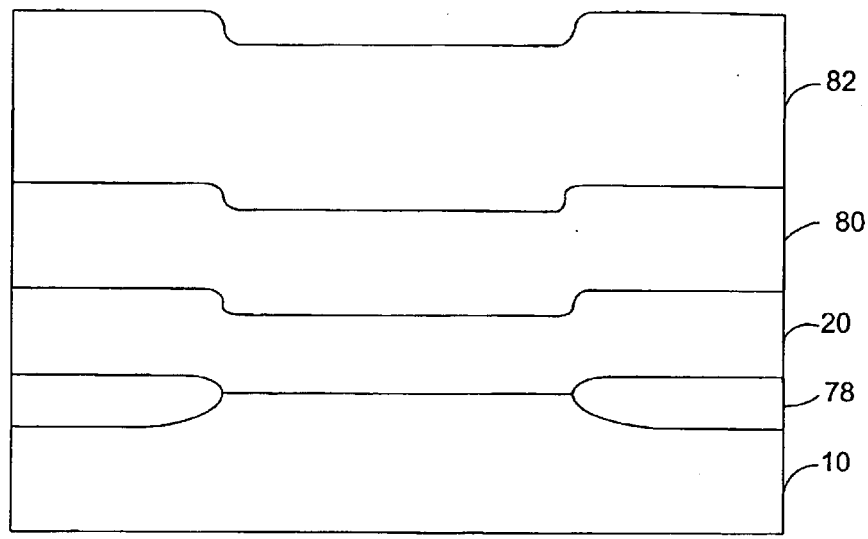

In FIG. 11E a conductive layer 82 is applied on the previously applied layers on substrate 10, such as adhesive layer 80 if used. Preferably, the conductive layer is formed using conventional deposition techniques. The conductive layer is preferably gold that is about 500 to about 1000 Angstroms thick.

Figure 11F:
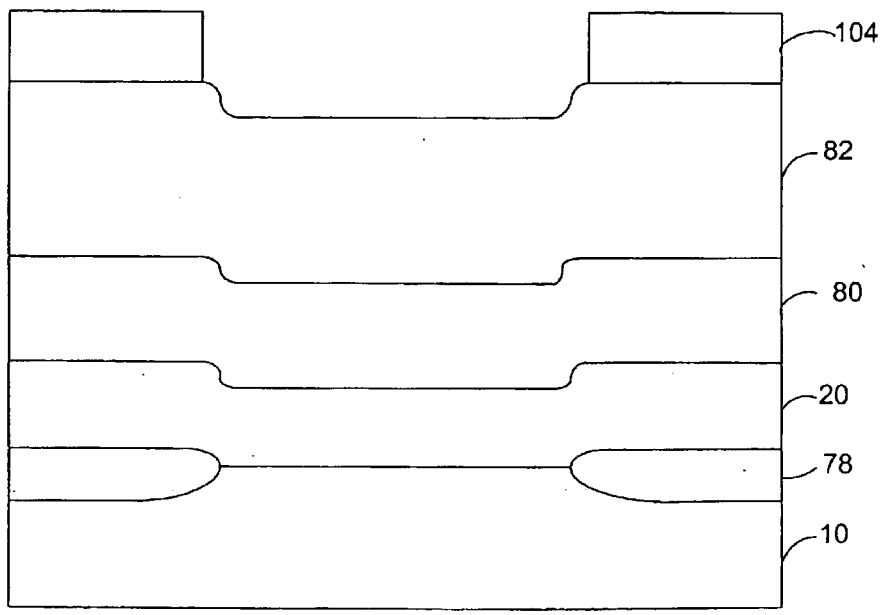

In FIG. 11F a patterning layer 104 is applied on the conductive layer 82 and an opening is formed within it to define an etching region for creating the integrated emitter. Preferably, the patterning layer 104 is a positive photoresist layer of about 1 micrometer thickness.

Figure 11G:
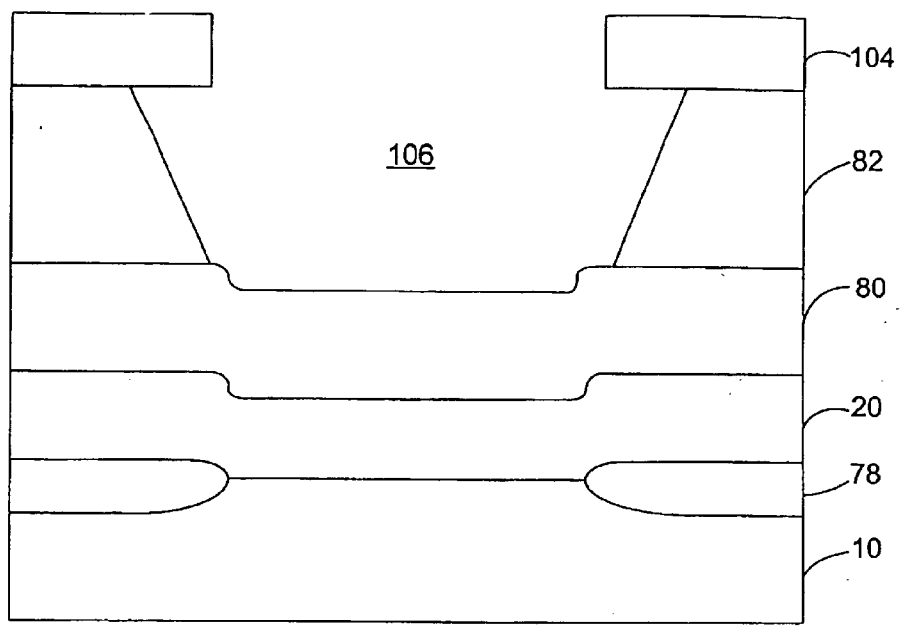

In FIG. 11G, preferably a wet etch process is used to create an opening in the conductive layer 82 within the opening of the patterning layer 104. Typically, the etching will create an isotropic etch profile 106 as shown in which a portion of the conductive layer is undercut under the patterning layer 104. Preferably the wet etch process used does not react with the adhesive layer 80, if used, to prevent the etch material from reaching the substrate 10. Optionally, a dry etch process can be used to etch the conductive layer 82.

Figure 11H:
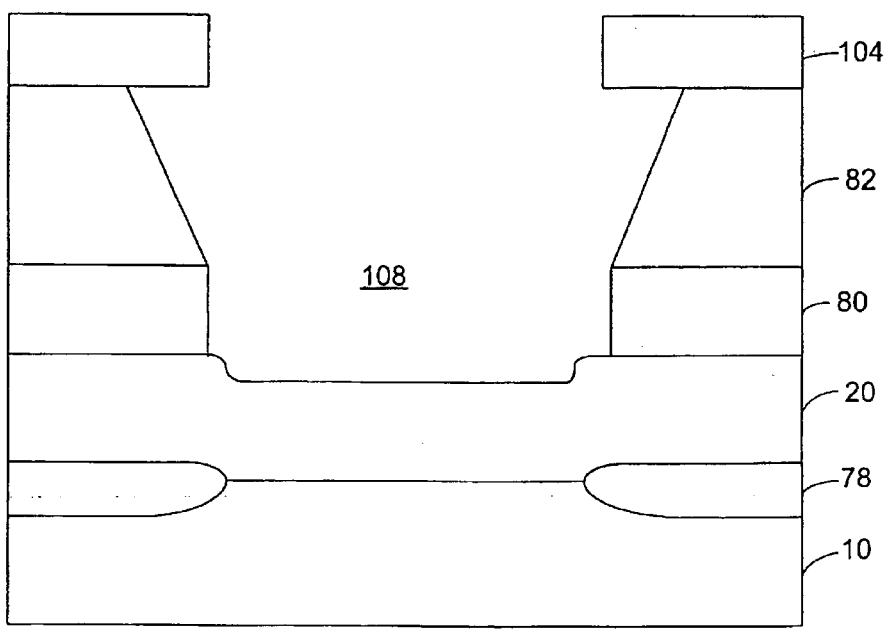

In FIG. 11H, preferably a dry etch process that is reactive to the adhesive layer 80 is used to create an anisotropic profile 108.

Figure 11I:
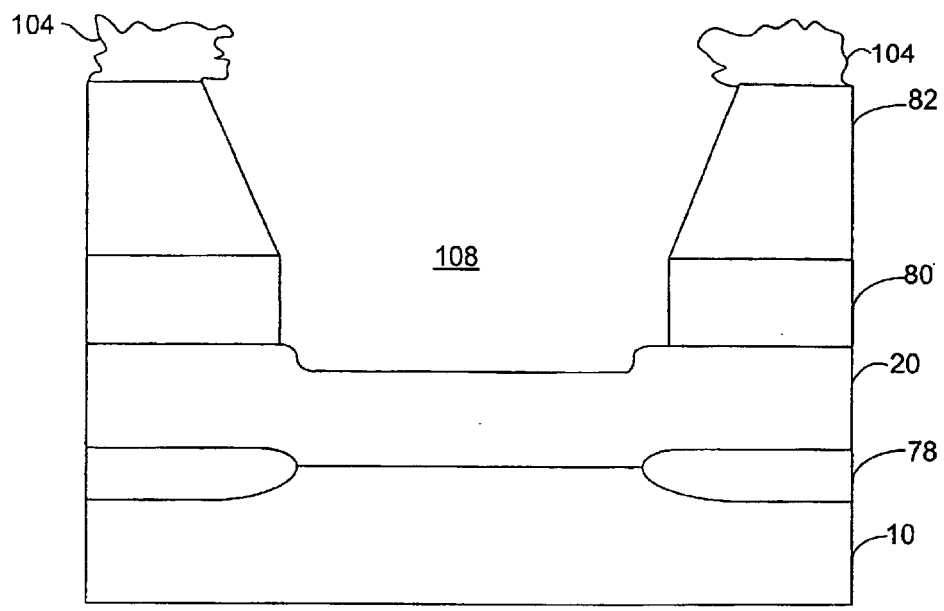

In FIG. 11I a lift-off process is used to remove patterning layer 104. Preferably, low temperature plasma is used to reactively etch ash organic materials within the patterning layer 104. The gas used is preferably oxygen in a planer plasma etch process. The processed substrate 10 is place in a chamber and the oxygen is introduced and excited by an energy source to create a plasma field. The plasma field energizes the oxygen to a high energy state, which, in turn oxidizes the patterning layer 104 components to gases that are removed from the chamber by a vacuum pump Optionally, a wet lift-off process can be used in lieu of the plasma lift-off process. The processed substrate 10 is immersed in a solvent that will swell and remove the patterning layer 104.

Figure 11J:
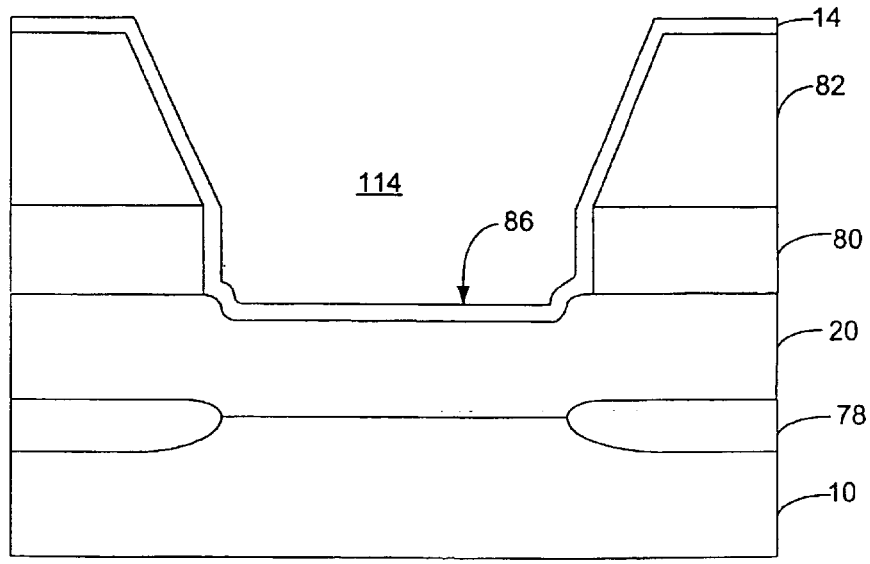

FIG. 11J shows the application of a cathode layer 14 over the surface of the processed substrate 10. The cathode layer 14 is preferably a thin-film metallic layer such as platinum and preferably has a thickness of about 50 to about 250 Angstroms. Other metals can be used for cathode layer 14 such as gold, molybdenum, iridium, ruthenium, tantalum, chromium, or other refractive metals or alloys thereof, to name a few. The cathode layer 14 disposed on silicon-based dielectric layer 20 forms the emitter surface 86 within the emitter chamber 114.

Figure 11K:
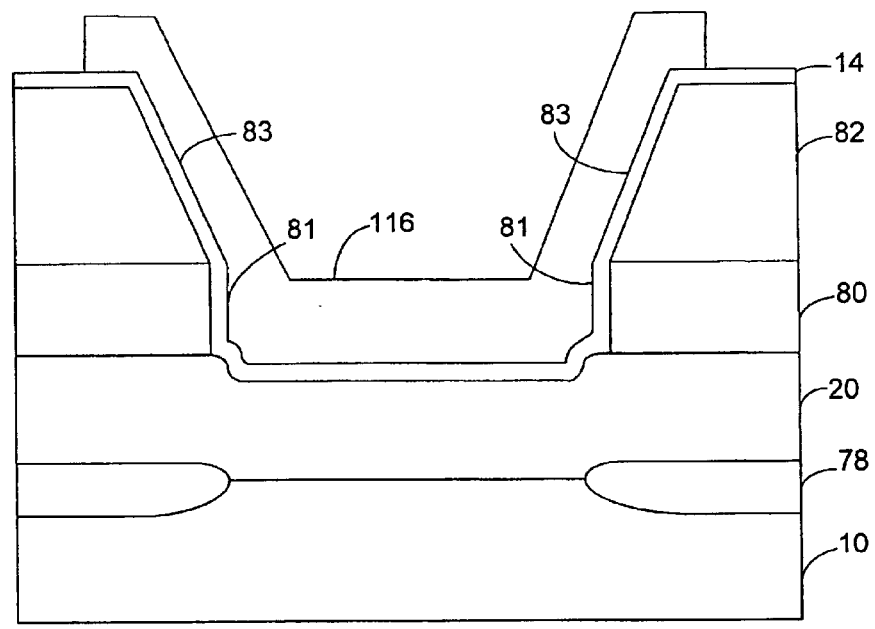
Figure 11L:
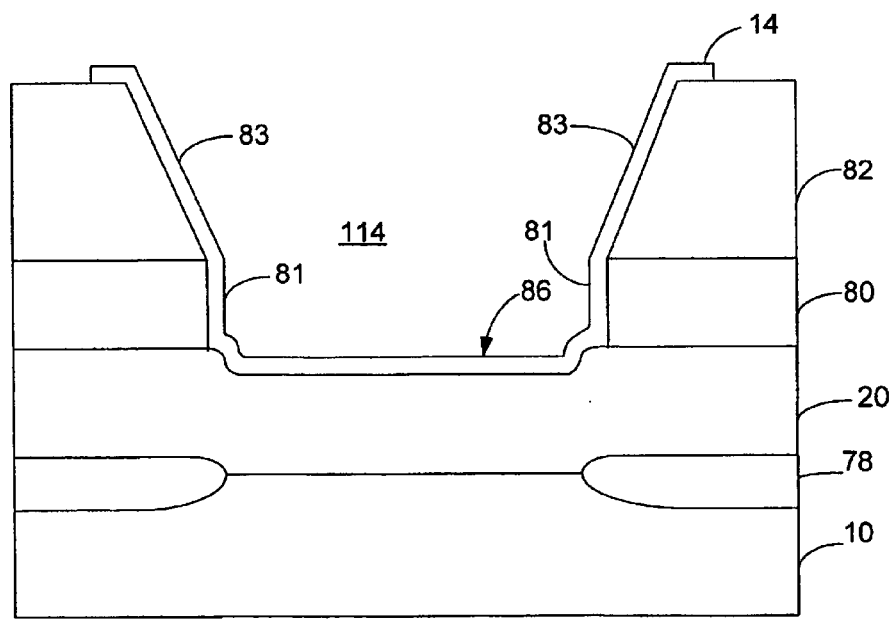

FIG. 11K illustrates the application of a cathode photoresist layer 116 that has been applied and patterned to define openings where the cathode layer 14 is to be etched to isolate multiple emitters on the substrate 10. FIG. 11L illustrates the cathode layer 14 after it has been etched and the cathode photoresist 116 removed. Within the emitter chamber 114 is the emitter surface 86. An exemplary top view of the resulting structure is shown in FIG. 8. The emitter surface 86 has a first area. The emitter chamber 114 has a first chamber section interfacing to the emitter surface 86 that has substantially parallel sidewalls 81 within the adhesion layer 80. The emitter chamber 114 has a second chamber section formed in the conductive layer 82 that has sidewalls 83 that diverge to an opening having a second area. The second area is larger than the first area. The cathode layer 14 is disposed on the emitter surface 86 and the sidewalls (81,83) of the first and second sections of the emitter chamber 114. By using integrated circuit thin film technology to fabricate the emitter, it can be integrated along with traditional active circuits found on conventional integrated circuits. The integrated circuit with the emitter can be used in display devices or storage devices as previously described. Preferably, after fabrication, the emitter is subjected to an annealing process to increase the amount of emission from the emitter.

Figure 12A:
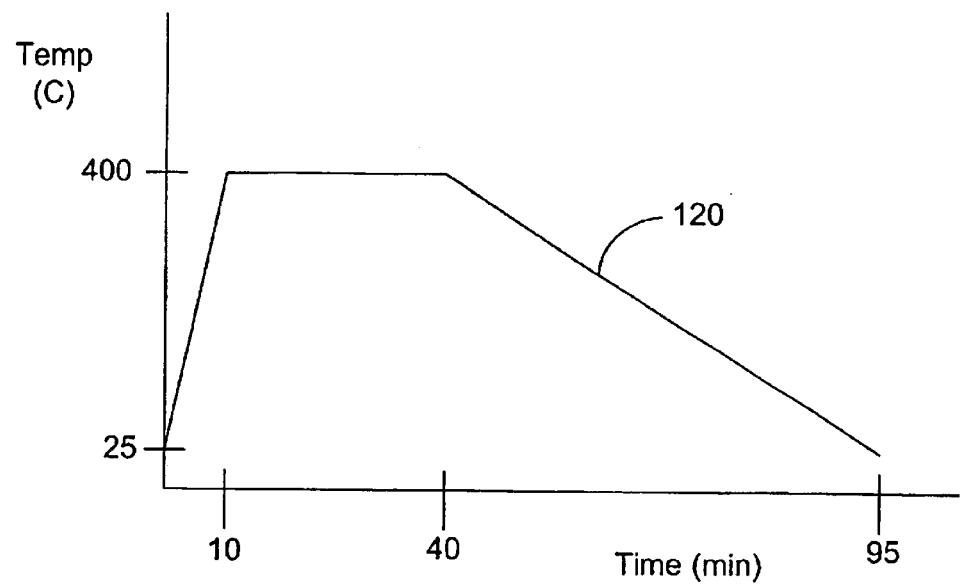
FIGS. 12A and 12B are charts of exemplary annealing processes used to optionally improve the tunneling emitters of the invention.
Figure 12B:
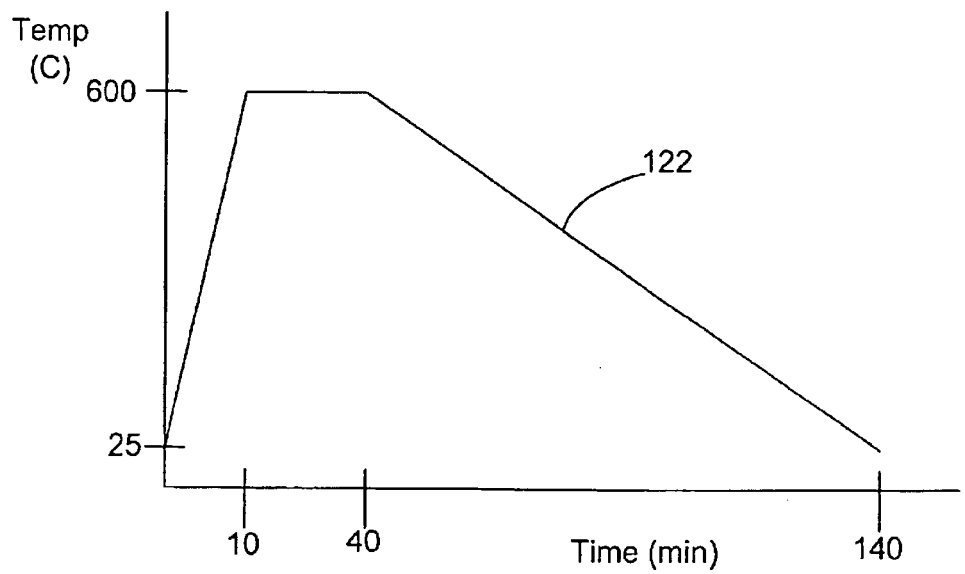

FIGS. 12A and 12B are charts of exemplary annealing processes which are used to increase the emission current capability of an emitter embodying the invention. The annealing process also increases the device yields and quality by allowing the emitters to last longer. The annealing process, among other benefits, helps to decrease the resistance of contacts of dissimilar metals thereby increasing the current flow to the emitters. Examination of the annealed emitters reveals that the cathode layer has nano-porous opening on the order of less than 200 nanometers in at least one direction of length, width, or diameter.

In FIG. 12A, a first thermal profile 120 shows the processed substrate that includes an emitter incorporating the invention first elevated to a temperature of about 400 C. within 10 minutes then held at this temperature for 30 minutes. Then the processed substrate is slowly cooled back to room temperature (about 25 C.) over a period of about 55 minutes. In FIG. 12B, a second thermal profile 122 shows the processed substrate including an emitter incorporating the invention heated to a temperature of about 600 C. within 10 minutes and held at that temperature for about 30 minutes. Then, the processed substrate is gradually cooled to room temperature over a period of about 100 minutes. Those skilled in the art will appreciate that the elevated temperature and the rate of cooling can be modified from the exemplary processes described and still meet the spirit and scope of the invention. By annealing the substrate that includes at least one emitter incorporating the invention, several characteristics of the emitter are improved.

What is claimed is:

1. A method for creating an emitter on an electron supply, comprising the steps of:

forming a silicon-based dielectric emitter using semiconductor thin-film layers on the electron supply, at least one of the thin-film layers being a film characterized as a silicon-based dielectric tunneling layer with a thickness of less than 500 Angstroms;

applying a cathode layer on the silicon-based dielectric tunneling layer; and annealing the emitter to increase the tunneling current of the emitter by creating nano-porous openings in the cathode layer.

2. An emitter created by the process of claim 1.

3. The method of claim 1 wherein the step of applying the silicon-based dielectric layer further comprises the step of applying a silicon-based dielectric from the group consisting of SiC, $SiN_x$, $Si_xN_y$, $Si_3N_4$, $F_y$—$SiO_x$, and $C_y$—$SiO_x$.

4. The method of claim 1 wherein the step of applying a cathode layer on the silicon-based dielectric layer, includes applying the cathode layer selected from the group consisting of platinum, gold, molybdenum, ruthenium, tantalum, iridium, other refractory metals and alloys thereof.

5. A method for creating an emitter on an electron supply, comprising the steps of:

forming a silicon-based dielectric emitter using semiconductor thin-film layers on the electron supply, at least one of the thin-film layers being a film characterized as a silicon-based dielectric tunneling layer with a thickness between about 250 Angstroms and about 5000 Angstroms;

applying a cathode layer on the silicon-based dielectric tunneling layer; and annealing the emitter to increase the tunneling current of the emitter by creating nano-porous openings in the cathode layer.

6. A method for creating an emitter on an electron supply, comprising the steps of:

applying a silicon-based dielectric tunneling layer over an insulating layer disposed on the electron supply, the insulator layer defining an opening to the electron supply;

applying a conductive layer to adhere to the silicon-based dielectric tunneling layer;

applying a patterning layer on the conductive layer;

creating an opening in the patterning and conductive layer to the silicon based dielectric tunneling layer;

etching the patterning layer to remove it by lift-off from the conductive layer;

applying a cathode layer on the silicon-based dielectric tunneling layer; and annealing the emitter to increase the tunneling current by creating nano-porous openings in the cathode layer.

7. An emitter created by the process of claim 6.

8. The method of claim 6 wherein the applied silicon-based dielectric tunneling layer has a thickness less than about 500 Angstroms.

9. A method for creating an emitter on an electron supply surface, the method comprising the steps of:

creating an insulator layer on the electron supply surface;

defining an emission area within the insulator layer;

applying a silicon-based dielectric tunneling layer over the insulator layer and the opening;

applying an adhesion layer on the silicon-based dielectric tunneling layer;

applying a conduction layer on the adhesion layer;

applying a patterning layer on the conduction layer;

creating an opening to the conduction layer in the patterning layer;

etching the conduction layer in the opening to the adhesion layer;

etching the adhesion layer to the silicon-based dielectric tunneling layer;

etching the patterning layer by lift off;

applying a cathode layer over the portion of the silicon-based dielectric tunneling layer and a portion of the conduction layer;

etching the cathode layer; and annealing the emitter to create nano-porous openings in the cathode layer.

10. An emitter created by the process of claim 9.

11. The method of claim 9 wherein the applied silicon-based dielectric tunneling layer has a thickness less than 500 Angstroms.

12. The method of claim 9 wherein the applied silicon-based dielectric tunneling layer has a thickness in the range of about 250 to 5000 Angstroms.

* * * * *